(12) United States Patent
Hoffmann

(10) Patent No.: US 12,073,355 B2
(45) Date of Patent: Aug. 27, 2024

(54) METHOD FOR TRACKING COMPONENTS

(71) Applicant: Bayerische Motoren Werke Aktiengesellschaft, Munich (DE)

(72) Inventor: Juergen Hoffmann, Holzkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 375 days.

(21) Appl. No.: 17/293,654

(22) PCT Filed: Oct. 17, 2019

(86) PCT No.: PCT/EP2019/078219
§ 371 (c)(1),
(2) Date: May 13, 2021

(87) PCT Pub. No.: WO2020/099059
PCT Pub. Date: May 22, 2020

(65) Prior Publication Data
US 2022/0012676 A1     Jan. 13, 2022

(30) Foreign Application Priority Data
Nov. 14, 2018 (DE) ...................... 10 2018 128 498.5

(51) Int. Cl.
*G06Q 10/087* (2023.01)
*G06F 16/28* (2019.01)
(Continued)

(52) U.S. Cl.
CPC ......... *G06Q 10/087* (2013.01); *G06F 16/288* (2019.01); *G06Q 10/0833* (2013.01); *G06T 7/50* (2017.01); *G06V 10/255* (2022.01)

(58) Field of Classification Search
CPC .. G06Q 10/087; G06Q 10/0833; G06Q 50/04; G06Q 10/0875; G06F 16/288;
(Continued)

(56) References Cited

U.S. PATENT DOCUMENTS 5,101,359 A    3/1992  Gross
5,926,556 A *  7/1999  Douglas ............. G06K 7/10722
                                                    382/293
(Continued)

FOREIGN PATENT DOCUMENTS

CN    101620420 A    1/2010
CN    102446266 A    5/2012
(Continued)

OTHER PUBLICATIONS

Wikipedia. "Manufacturing execution system" Internet Article, Jun. 27, 2018 (Jun. 27, 2018)https //en.wikipedia org/w/index php?title=Manufacturing_execution_system&oldid=847747726[retrieved on Nov. 13, 2019] (Year: 2018).*

(Continued)

*Primary Examiner* — Michael Jared Walker
(74) *Attorney, Agent, or Firm* — Crowell & Moring LLP

(57) ABSTRACT

A method for tracking components includes running individual metal blanks with a respective individual part number through a press device to form respective individual components. The components are output on an outflow conveyor belt, removed from the outflow conveyor belt, and arranged in one of a plurality of containers that have a respective container identifier. The movement of the individual components from being output on the outflow conveyor belt until being arranged in the one of the plurality of containers is captured by a camera system. A link is created between respective individual part numbers and respective individual container identifiers and stored in a database.

11 Claims, 1 Drawing Sheet

(51) Int. Cl.
*G06Q 10/0833* (2023.01)
*G06T 7/50* (2017.01)
*G06V 10/20* (2022.01)

(58) Field of Classification Search
CPC .............. G06T 7/50; G06T 2207/30164; G06T 7/0004; G06V 10/255; Y02P 90/30
See application file for complete search history.

(56) References Cited

U.S. PATENT DOCUMENTS

| | | | |
|---|---|---|---|
| 5,960,930 | A | 10/1999 | Hawkins |
| 6,315,199 | B1 | 11/2001 | Ito et al. |
| 2008/0221721 | A1* | 9/2008 | Reed .................. C23C 14/3414 700/109 |
| 2011/0300397 | A1 | 12/2011 | Sugita et al. |
| 2016/0371512 | A1* | 12/2016 | Hattrup .............. G06K 15/1835 |
| 2018/0025185 | A1* | 1/2018 | Hattrup ................ G06K 15/024 705/14.1 |
| 2018/0032951 | A1 | 2/2018 | Chanez et al. |

FOREIGN PATENT DOCUMENTS

| | | |
|---|---|---|
| CN | 107209881 A | 9/2017 |
| CN | 107851221 A | 3/2018 |
| DE | 100 34 606 A1 | 2/2002 |
| DE | 10 2014 201 273 A1 | 7/2015 |
| DE | 10 2014 114 506 A1 | 4/2016 |
| DE | 10 2015 221 417 A1 | 5/2017 |
| FR | 2 544 888 A1 | 10/1984 |
| JP | 2003-316413 A | 11/2003 |
| WO | WO 02/073551 A1 | 9/2002 |

OTHER PUBLICATIONS

German Search Report issued in German application No. 10 2018 128 498.5 dated Jul. 23, 2021, with Statement of Relevancy (Nine (9) pages).

"Machine vision", *Wikipedia*, URL: https://en.wikipedia.org/w/index.php?title=Machine_vision&oldid=866, Oct. 27, 2018 (Eight (8) pages).

PCT/EP2019/078219, International Search Report dated Nov. 26, 2019 (Three (3) pages).

Wikipedia, "Manufacturing execution system", *Internet Article*, Jun. 27, 2018, URL: https://en.wikipedia.org/w/index.php?title=Manufacturing_execution_sytem&oldid=847747720, XP055641974, 5 pp.

Wikipedia, "Track and trace", *Internet Article*, Aug. 23, 2018, URL: https://en.wikipedia.org/w/index.php?title=Track_and_trace&oldid=856176057, XP055641978, 2 pp.

Wikipedia, "QR code", *Internet Article*, Oct. 30, 2018, URL: https://en.wikipedia.org/w/index.php?title=QR_code&oldid=866408880, XP055641984, 26 pp.

Bartneck et al., "Optimizing Processes with RFID and Auto ID—Fundamentals, Problems and Solutions, Example Applications", *Publicis Publishing*, Apr. 20, 2009, XP055641946, 136 pp.

Ahmed Nabil Belbachir, "Smart Cameras", New York, USA, *Springer*, Dec. 2, 2009, XP0553803659, 123 pp.

C9 English-language Chinese Office Action issued in Chinese Application No. 201980050612.2 dated Oct. 27, 2023 (7 pages).

English-language Chinese Office Action issued in Chinese Application No. 201980050612.2 dated Mar. 7, 2024 (10 pages).

* cited by examiner

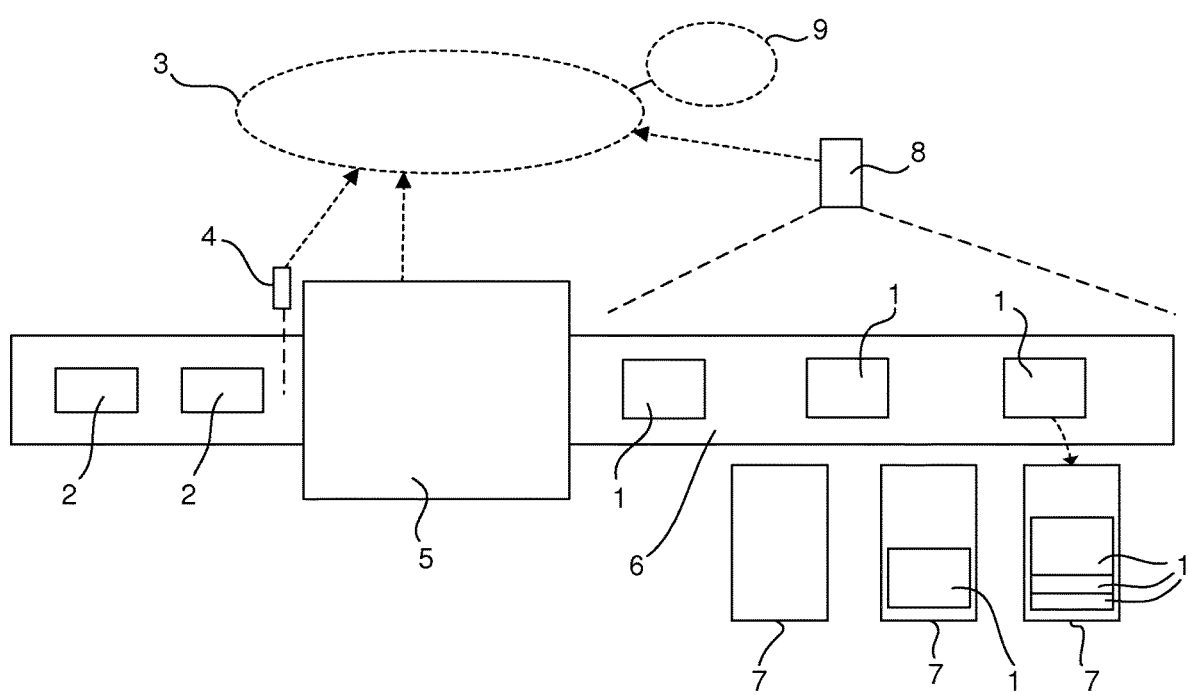

METHOD FOR TRACKING COMPONENTS

BACKGROUND AND SUMMARY OF THE INVENTION

A method for tracking components is specified. The components may in particular be bodywork components produced from metal blanks.

In the prior art, bodywork components are placed on an outflow conveyor belt after being shaped in a shaping press. On the outflow conveyor belt, the components are assessed in terms of their quality by workers and are stacked in containers. The order in which the components are placed or the containers in which the components are arranged is not usually taken into consideration here.

The number of components stacked in each container is also not counted, but rather only estimated. There is no check as to whether the correct components are in the correct container. If an error is identified in a batch, it is possible only with great difficulty to locate the containers in which the defective components are arranged.

Based on the prior art, one object of at least some embodiments is therefore to specify a method for tracking components, by way of which the fill level of the respective containers is able to be captured and by way of which it is made easier to locate defective components.

This object is achieved by a method according to the invention. Advantageous embodiments and developments become further apparent from the following description and from the drawing.

In the method described here, a metal strip, which is generally also referred to as "coil", is separated to form metal blanks. The separation may be performed for example by a separation installation or coil installation. During the separation process, material properties of the individual metal blanks may already be captured. The metal blanks are furthermore provided with individual part numbers. By way of example, the metal blanks may each be inscribed with the individual part numbers by a laser.

The individual part numbers are furthermore recorded in an information technology system. The information technology system is an electronic data processing system, such as for example a computer, a server system, a database system or a cloud. The individual part numbers in the information technology system may furthermore be linked to one or more material and/or process parameters, such as for example to material properties of the respective blank or parameters regarding following machining processes.

The individual metal blanks are captured by way of a capturing device by reading the individual part numbers before the metal blanks run through a press device. The capturing device may be for example a camera, in particular a special camera that is suitable for being able to recognize very small part numbers, even on a reflective surface of the metal blanks.

The metal blanks then run through the press device, which may be designed for example as a press line having a large number of individual presses, wherein the metal blanks are shaped by at least one press of the press device to form components. The metal blanks may in particular be shaped to form bodywork components. After shaping, the components are output on an outflow conveyor belt.

The shaped components are then removed from the outflow conveyor belt and each arranged in containers having individual container identifiers. The components are removed or the components are arranged in the containers preferably manually by a worker. In this case, the worker may also check the quality of the components.

The movement of the components, from the time when they are output on the outflow conveyor belt until they are arranged in the containers, is captured by a camera system that may have one or more cameras. The camera system may be connected for example to an image evaluation device that is designed to recognize the respective components on the basis of their size and/or shape.

A link is also created between the individual part numbers and the individual container identifiers and is stored in a database. The database may be either the information technology system or a database that is separate from the information technology system and that is able to be connected to the information technology system in order to exchange data.

By virtue of connecting the camera system or the image evaluation device of the camera system to the information technology system and/or the database, it is possible to transmit all of the information or data regarding the components removed from the outflow conveyor belt and arranged in the containers to the information technology system or the database. The press device may furthermore have a control device that is designed to transmit data, such as for example parameters of the shaping press or of the shaping presses and/or parameters of the shaping process or of the individual shaping processes, to the information technology system and/or to the database. By way of example, it is possible to ascertain the position at which a respective metal blank or the component produced therefrom is located or when the shaped component is placed on the outflow conveyor belt from the clocking of the press device or of the press line. It is thereby advantageously possible to create a link between an individual part number and an individual container identifier of a container in which a particular component has been placed, in particular without it being necessary to read the individual part numbers following the shaping process by the press device. Such reading of part numbers of shaped components is thereby able to be avoided.

By virtue of the method described here, it is advantageously possible to read the part numbers, which are difficult to read, only once on the flat metal blanks, and not on the shaped components. The camera system may use specific algorithms to recognize the respective components, such that incorrect filling of the containers is able to be avoided.

According to a further embodiment, after the metal blanks have been shaped to form components, a quality check is performed on the components, wherein the quality check on the components is captured by the camera system. The quality check may be performed manually by one or more workers or alternatively in an automated manner, for example by one or more cameras. After the quality check, the components may be placed back on the outflow conveyor belt or into the containers, wherein the placement onto the outflow conveyor belt or into the containers is again captured by the camera system. Components that are identified as reject components are recognized by the camera system and recorded as a reject component in the information technology system or in the database.

According to a further embodiment, a content directory containing the number and type of the components arranged in each container is created in the database. By virtue of creating one or more content directories, it is possible to quickly locate components, in particular including faulty components, meaning that it is advantageously possible to reduce post-sorting expenditure.

Dispatching of the containers filled with components may furthermore be organized by a logistics system that receives data from the database. The information technology system may thus use the fill level of the respective containers to control the logistics system for prompt dispatching of the containers. A goods dispatch note on the respective containers may furthermore advantageously be dispensed with.

Further advantages and advantageous embodiments of the method described here for tracking components become apparent from the embodiment described below in connection with the FIGURE.

BRIEF DESCRIPTION OF THE DRAWING

FIG. 1 shows a schematic illustration of a method for tracking components according to one exemplary embodiment of the invention.

DETAILED DESCRIPTION OF THE DRAWING

The illustrated elements and their orders of magnitude with respect to one another should in principle not be considered to be true to scale. Rather, individual elements may be illustrated as being excessively thick or large for the purpose of improved representation and/or for the purpose of improved understanding.

FIG. 1 shows a schematic illustration of a method, described here, for tracking components 1 according to one exemplary embodiment. In this case, metal blanks 2 are separated from a metal strip or metal coil and provided with individual part numbers (not illustrated). The individual part numbers are recorded in an information technology system 3, which may be designed for example as a cloud. The individual part numbers may furthermore be linked to material and/or process parameters.

The individual metal blanks are captured by way of a capturing device 4, which may be for example be a camera, such as for example a line scan camera, before the metal blanks 2 run through a press device 5, and corresponding information or data may be forwarded to the information technology system 3. The press device 5 may be for example a press line containing a plurality of shaping presses.

The metal blanks 2 then run through the press device 5, wherein the metal blanks 2 are shaped through a shaping process to form components 1. The components 1 are preferably bodywork components. After shaping, the components 1 are output on an outflow conveyor belt 6.

The components 1 are then removed manually from the outflow conveyor belt 6 and arranged in containers 7 that have individual container identifiers. The movement of the respective components 1 is captured, from being output on the outflow conveyor belt 6 until being arranged in the containers 7, by a camera system 8 that may have one or more cameras. The camera system 8 may be connected to an image evaluation device that is able to transmit data to the information technology system 3, such that it is possible to create a link between the individual part numbers and the individual container identifiers and store it in a database 8.

By virtue of recording the components 1 from being output on the outflow conveyor belt 6 until being arranged in the respective containers 7 by way of the camera system 8, it is possible to track the individual components 1 as far as the placement location in the containers 7, without complicated reading of the individual part numbers on the shaped components being necessary.

A content directory containing the number and type of components 1 arranged in each container 7 may be created in the database 9, such that it is possible to locate all of the components, as a result of which it is advantageously possible to reduce post-sorting expenditure. The dispatching of the containers 7 filled with components 1 may furthermore be organized by a logistics system that receives data from the database 9, such that the fill level of the containers 7 may be used to control prompt dispatching of the containers.

As an alternative or in addition, the exemplary embodiment shown in the FIGURE may have further features according to the embodiments of the general description.

LIST OF REFERENCE CHARACTERS 1 component
2 metal blank
3 information technology system
4 capturing device
5 press device
6 outflow conveyor belt
7 container
8 camera system
9 database

What is claimed is:

1. A method for tracking components, comprising the steps of:
   separating a metal strip to form individual metal blanks;
   providing each of the individual metal blanks with a respective individual part number;
   recording the individual part numbers in an information technology system;
   capturing the individual metal blanks by a capturing device by reading the individual part numbers before the individual metal blanks run through a press device;
   running the individual metal blanks through the press device, wherein the individual metal blanks are shaped by a shaping press of the press device to form respective individual components and outputting the individual components on an outflow conveyor belt;
   removing the individual components from the outflow conveyor belt and arranging each of the individual components in one of a plurality of containers wherein each of the plurality of containers has a respective container identifier;
   capturing a movement of the individual components from being output on the outflow conveyor belt until being arranged in the one of the plurality of containers by a camera system;
   creating a link between respective individual part numbers and respective individual container identifiers; and
   storing the link in a database.

2. The method according to claim 1, wherein the individual components are each a respective bodywork component.

3. The method according to claim 1, wherein the press device has a control device that is configured to transmit data to the information technology system.

4. The method according to claim 3, wherein the control device transmits one or more process parameters of the press device and/or of the shaping press to the information technology system.

5. The method according to claim 1, wherein the camera system has a plurality of cameras.

6. The method according to claim 1, wherein the capturing device has a camera.

7. The method according to claim 1, wherein no reading of the individual part numbers takes place after the individual metal blanks have been shaped.

8. The method according to claim 1, wherein the camera system is connected to an image evaluation device.

9. The method according to claim 1, wherein after the individual metal blanks have been shaped, a quality check, which is captured by the camera system, is performed on the individual components.

10. The method according to claim 1 further comprising the step of creating a content directory in the database for each of the plurality of containers that contains respective individual part numbers and respective types of components for components that are arranged in each of the plurality of containers.

11. The method according to claim 1 further comprising the step of organizing a dispatching of the plurality of containers filled with the components by a logistics system that receives data from the database.

\* \* \* \* \*